US010514885B2

United States Patent
Leppänen et al.

(10) Patent No.: US 10,514,885 B2
(45) Date of Patent: Dec. 24, 2019

(54) APPARATUS AND METHOD FOR CONTROLLING AUDIO MIXING IN VIRTUAL REALITY ENVIRONMENTS

(71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/779,188

(22) PCT Filed: Nov. 29, 2016

(86) PCT No.: PCT/FI2016/050836
§ 371 (c)(1),
(2) Date: May 25, 2018

(87) PCT Pub. No.: WO2017/093605
PCT Pub. Date: Jun. 8, 2017

(65) Prior Publication Data
US 2018/0349088 A1 Dec. 6, 2018

(30) Foreign Application Priority Data
Nov. 30, 2015 (EP) .................................... 15197128

(51) Int. Cl.
*H03G 5/02* (2006.01)
*G06F 3/16* (2006.01)
(Continued)

(52) U.S. Cl.
CPC .............. *G06F 3/165* (2013.01); *G06F 3/011* (2013.01); *G06F 3/013* (2013.01);
(Continued)

(58) Field of Classification Search
CPC .... G06F 3/165; G06F 3/167; G06F 17/30061; G06F 3/011; G06F 3/04815;
(Continued)

(56) References Cited

U.S. PATENT DOCUMENTS

| 8,335,580 B2 * | 12/2012 | Ikeda | G11B 27/105 463/35 |
| 2002/0141597 A1 * | 10/2002 | Wilcock | G06F 3/167 381/61 |

(Continued)

FOREIGN PATENT DOCUMENTS

| GB | 2543275 A | 4/2017 |
| GB | 2543276 A | 4/2017 |

OTHER PUBLICATIONS

"Live Television Audio Mixing—Nov. BYU Volleyball Mixlapse", Youtube, Retrieved on May 4, 2018, Webpage available at : https://www.youtube.com/watch?v=hukWwBEvMT4.

(Continued)

*Primary Examiner* — Norman Yu
(74) *Attorney, Agent, or Firm* — Alston & Bird LLP

(57) ABSTRACT

An apparatus comprising: at least one processor; and at least one memory including computer program code, the at least one memory and the computer program code configured to, with the at least one processor, cause the apparatus to perform at least the following: based on a plurality of distinct audio sources visible in a current virtual or augmented reality view, provide for control of audio mixing of groups of the distinct audio sources in the virtual or augmented reality view, the groups determined by automatic grouping of the distinct audio sources based on analysis of the type of audio from each of the distinct audio sources.

20 Claims, 6 Drawing Sheets

(51) Int. Cl.
*G06F 3/01* (2006.01)
*G06Q 50/10* (2012.01)
*G06T 19/00* (2011.01)
*G06F 3/0481* (2013.01)
*G06F 3/0488* (2013.01)

(52) U.S. Cl.
CPC ...... *G06F 3/04815* (2013.01); *G06F 3/04883* (2013.01); *G06Q 50/10* (2013.01); *G06T 19/006* (2013.01)

(58) Field of Classification Search
CPC . G06F 2217/82; G06T 19/006; G06T 15/205; G06K 9/00671; H04S 7/302
USPC ...... 381/17, 310, 56, 61, 104, 107; 345/419, 345/633; 700/94; 463/31
See application file for complete search history.

(56) References Cited

U.S. PATENT DOCUMENTS

2008/0252637 A1* 10/2008 Berndt .................... G06T 19/00
345/419
2014/0237366 A1* 8/2014 Poulos .................... G06F 3/013
715/728
2016/0036962 A1* 2/2016 Rand .................... H04R 1/1041
455/418

OTHER PUBLICATIONS

Chou et al., "Robust Singing Detection in Speech/Music Discriminator Design", IEEE International Conference on Acoustics, Speech, and Signal Processing (ICASSP '01), May 7-11, 2001, 4 pages.

Shenoy et al., "Singing Voice Detection for Karaoke Application", Visual Communications and Image Processing, Proceedings of the SPIE, vol. 5960, 2005, pp. 752-762.

Schuller et al., "Feature Selection and Stacking for Robust Discrimination of Speech, Monophonic Singing, and Polyphonic Music", IEEE International Conference on Multimedia and Expo, (ICME), Jul. 6, 2005, 4 pages.

Extended European Search Report received for corresponding European Patent Application No. 15197128.0, dated Apr. 15, 2016, 7 pages.

International Search Report and Written Opinion received for corresponding Patent Cooperation Treaty Application No. PCT/FI2016/050836, dated Mar. 9, 2017, 10 pages.

Office action received for corresponding European Patent Application No. 15197128.0, dated Mar. 21, 2018, 6 pages.

* cited by examiner

Figure 10
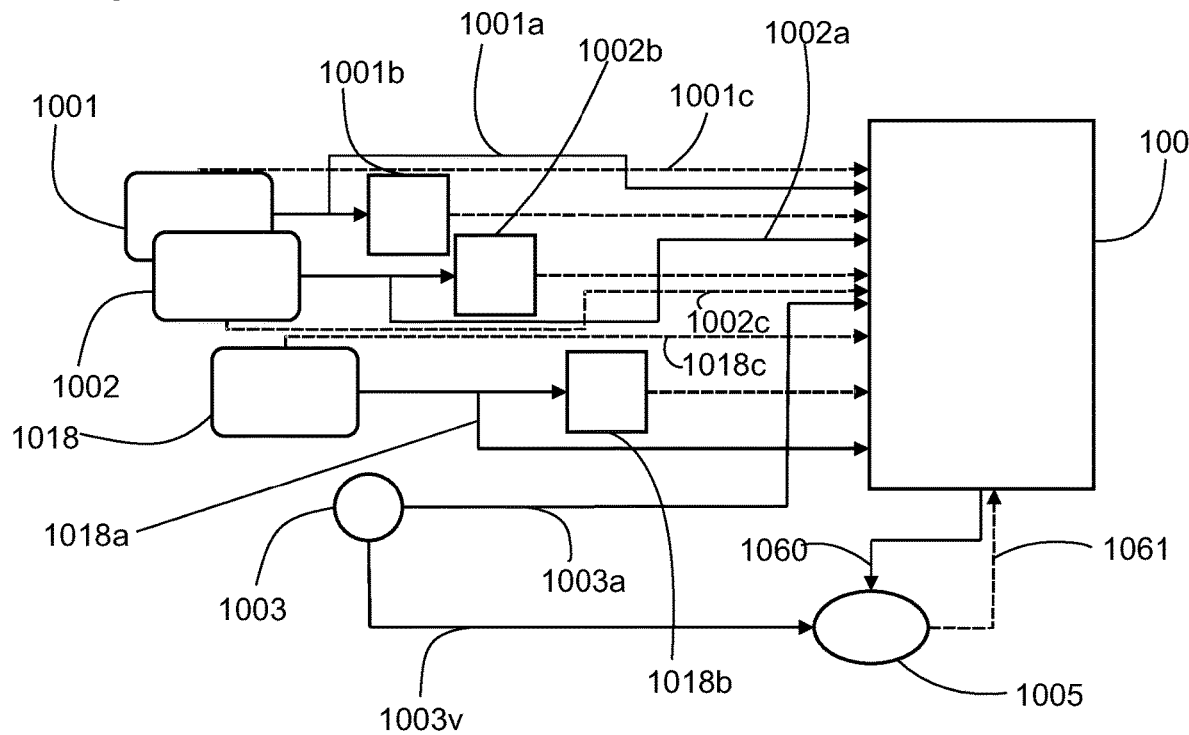
Figure 11
providing for control of audio mixing of groups of the distinct audio sources in the virtual reality view — 1170
Figure 12
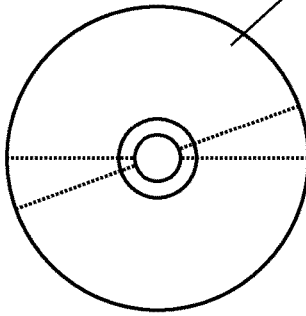

APPARATUS AND METHOD FOR CONTROLLING AUDIO MIXING IN VIRTUAL REALITY ENVIRONMENTS

RELATED APPLICATION

This application was originally filed as Patent Cooperation Treaty Application No. PCT/FI2016/050836 filed Nov. 29, 2016 which claims priority benefit to European Patent Application No. 15197128.0, filed Nov. 30, 2015.

TECHNICAL FIELD

The present disclosure relates to the field of control of audio mixing of groups of distinct audio sources in a virtual or augmented reality view, associated methods, computer programs and apparatus. Certain disclosed aspects/examples relate to a virtual reality apparatus, a presence capture device, a portable electronic devices, in particular, virtual reality headsets/glasses, so-called hand-portable electronic devices which may be hand-held in use (although they may be placed in a cradle in use). Such hand-portable electronic devices include so-called Personal Digital Assistants (PDAs), mobile telephones, smartphones and other smart devices, smartwatches and tablet PCs.

The portable electronic devices/apparatus according to one or more disclosed aspects/embodiments may provide one or more audio/text/video/data communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture functions (e.g. using a (e.g. in-built) digital camera), and gaming functions.

BACKGROUND

The capture of virtual reality content is becoming more common, with virtual reality content producers producing different types of virtual reality content. For example, the virtual reality content may be created from panoramic or omni-directionally captured views of the real world, such as at events, concerts or other performances. Ensuring such virtual reality content has high production values is important.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising at least one processor and at least one memory including computer program code, the at least one memory and the computer program code configured to, with the at least one processor, cause the apparatus to perform at least the following:
based on a plurality of distinct audio sources visible in a current virtual or augmented reality view, provide for control of audio mixing of groups of the distinct audio sources in the virtual or augmented reality view, the groups determined by automatic grouping of the distinct audio sources based on analysis of the type of audio from each of the distinct audio sources.

This is advantageous as the control of the audio mixing of the audio sources may be based only on those that are visible to a user, director or sound engineer in the virtual or augmented reality view.

In one or more examples, the types of audio used for grouping comprises one or more of; speaking, singing, music, musical instrument type, shouting, screaming, chanting, whispering, a cappella, monophonic music and polyphonic music.

In one or more examples, the control of the audio mixing of groups of the distinct audio sources in the virtual or augmented reality view is further based on the location of the audio sources in the virtual or augmented reality view, wherein a control graphic is provided for display in the virtual or augmented reality view at said location to associate it with the audio source it represents, the control graphic providing feedback on the control of the audio mixing.

In one or more examples, the control graphic shows a current set point of the audio level of its associated audio source.

In one or more examples, the control graphic includes an audio level indicator indicative of an instantaneous property of the audio from the associated source.

In one or more examples, the automatic grouping of the distinct audio sources is based on one of;
a) audio sources within and outside of the current virtual or augmented reality view;
b) only audio sources within the current virtual or augmented reality view.

Thus, grouping may be performed independently whether or not the audio sources are visible in the virtual or augmented reality view while control of the audio sources is based on those visible in the virtual or augmented reality view.

In one or more examples, on receipt of a first user input, the apparatus is configured to provide for selection of one of the groups of the audio sources and on receipt of a second user input provide for collective adjustment of the audio level set point of the audio level of the audio sources of the selected group that are visible in the current virtual or augmented reality view. The first and second user input may be part of a single gesture.

In one or more examples, based on the location of the audio sources in the virtual or augmented reality view and the automatic grouping, a group graphic for each distinct audio source is provided for display in the virtual or augmented reality view and positioned therein based on the location to associate it with the audio source it represents, the group graphic providing feedback on which group a particular audio source is a member.

In one or more examples, the group graphic comprises, for each group, one or more of a different colour, a different pattern, a different textual designation, a different shape, or a different icon.

In one or more examples, the automatic grouping of the distinct audio sources is dynamic and the grouping is actively determined based on the current audio received from the audio sources.

In one or more examples, the automatic grouping is based on analysis of current audio from the audio sources and historic audio received form the audio sources, the historic audio comprising audio received a predetermined amount of time prior to a current time, wherein one or more of the plurality of distinct audio sources are each grouped in one or more groups based on the audio analysis at the current audio and the historic audio.

In one or more examples, the apparatus is configured to, based on one or more audio sources in the VR view, adjust the audio level of said one or more audio sources to adopt a predetermined audio level set point on receipt of user input.

In one or more examples, the predetermined audio level set point comprises an audio level set point of one other of the audio sources such that an audio level set point can be copied from one audio source to another.

In one or more examples, the apparatus is configured to provide for collective control of audio levels of audio sources comprising members of a particular group in a first edit mode and individual control of audio levels of members of the particular group in a second, group member edit mode.

In one or more examples, the apparatus is configured to receive signalling from microphones of the distinct audio sources representative of the audio of the audio sources, provide for control of audio mixing to generate mixed audio based on said audio and provide signalling to a virtual or augmented reality apparatus representative of the mixed audio for presentation along with the VR view. In one or more examples, the apparatus is configured to, based on a physical location signalling for each of the distinct audio sources, provide signalling to the virtual or augmented reality apparatus for display of audio mixing control graphics in the virtual or augmented reality view at a virtual location corresponding to the physical location.

In a further aspect there is provided a method, the method comprising, based on a plurality of distinct audio sources visible in a current virtual or augmented reality view, providing for control of audio mixing of groups of the distinct audio sources in the virtual or augmented reality view, the groups determined by automatic grouping of the distinct audio sources based on analysis of the type of audio from each of the distinct audio sources.

In a further aspect there is provided a computer readable medium comprising computer program code stored thereon, the computer readable medium and computer program code being configured to, when run on at least one processor, perform at least the following:

based on a plurality of distinct audio sources visible in a current virtual or augmented reality view, provide for control of audio mixing of groups of the distinct audio sources in the virtual or augmented reality view, the groups determined by automatic grouping of the distinct audio sources based on analysis of the type of audio from each of the distinct audio sources.

In a further aspect there is provided an apparatus, the apparatus comprising means for, based on a plurality of distinct audio sources visible in a current virtual or augmented reality view, providing for control of audio mixing of groups of the distinct audio sources in the virtual or augmented reality view, the groups determined by automatic grouping of the distinct audio sources based on analysis of the type of audio from each of the distinct audio sources.

The present disclosure includes one or more corresponding aspects, examples or features in isolation or in various combinations whether or not specifically stated (including claimed) in that combination or in isolation. Corresponding means and corresponding functional units (e.g., virtual reality graphic generator, augmented reality graphic generator, audio processor, user input processor, user input feedback enabler, object creator) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 10 illustrates an example functional diagram of an audio mixing system including the apparatus;

FIG. 11 illustrates a flowchart according to a method of the present disclosure; and FIG. 12 illustrates schematically a computer readable medium providing a program.

DESCRIPTION OF EXAMPLE ASPECTS

Figure 1:
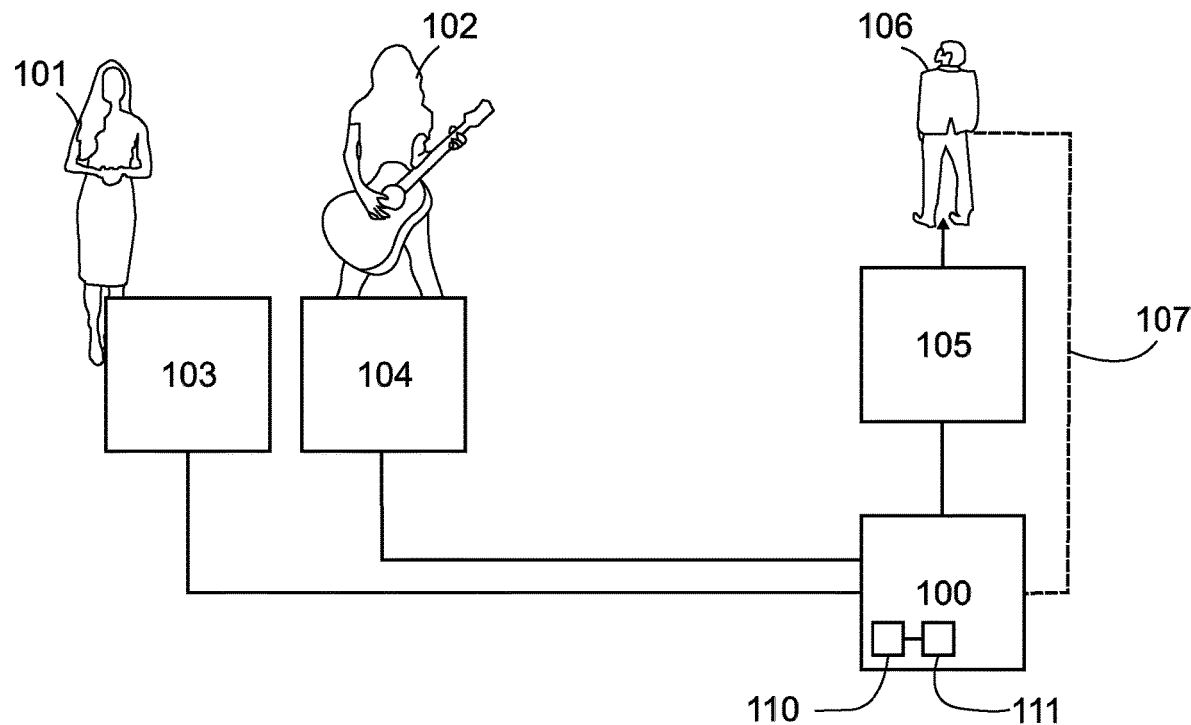
FIG. 1 illustrates an example apparatus embodiment comprising a number of electronic components, including memory and a processor, according to one embodiment of the present disclosure.

Virtual reality (VR) may use a VR display comprising a headset, such as glasses or goggles or virtual retinal display, or one or more display screens that surround a user to provide the user with an immersive virtual experience. A virtual reality apparatus, using the VR display, may present multimedia VR content representative of a virtual reality scene to a user to simulate the user being present within the virtual reality scene. The virtual reality scene may replicate a real world environment to simulate the user being physically present at a real world location or the virtual reality scene may be computer generated or a combination of computer generated and real world multimedia content. The virtual reality scene may be provided by a panoramic video (such as a panoramic live broadcast), comprising a video having a wide or 360° field of view (or more, such as above and/or below a horizontally oriented field of view).

The VR content provided to the user may comprise live or recorded images of the real world, captured by a presence capture device, for example. As the VR scene is typically larger than a portion a user can view with the VR display, the VR apparatus may provide for panning around of the VR view in the VR scene based on movement of a user's head or eyes.

Augmented reality (AR) may also use a headset, such as glasses or goggles or virtual retinal display, to augment a view of the real world as seen through the headset with computer generated content. Thus, a user of augmented reality may be able to view the real world environment around them, which is augmented or supplemented with content provided by an augmented reality apparatus, which may be overlaid on their view of the real world. The content may comprise multimedia content such as pictures, photographs, video, diagrams, textual information, aural content among others. Thus, while augmented reality may provide for direct viewing of the real world with the addition of computer generated graphics and content, a user of virtual reality may only be able to see content presented on displays of the virtual reality apparatus substantially without direct viewing of the real world.

Audio mixing comprises control of the absolute or relative levels of audio received from multiple audio sources. The levels may, among others, comprise volume, bass, treble or other audio frequency specific properties, as will be known to those skilled in audio mixing.

For conventional television broadcasts and the like, audio mixing may be performed by a director or sound engineer using a mixing desk, which provides for control of the various audio levels. However, for virtual reality content, which may provide an immersive experience comprising a viewable virtual reality scene greater than the field of view of a VR user and with audio sources at different locations in that scene, audio mixing is complex.

A presence capture device is configured to capture VR content for display to one or more users. A presence capture device may comprise one or more cameras and one or more (e.g. directional) microphones configured to capture the surrounding visual and aural scene from a capture point of view. Thus, a musical performance may be captured (and recorded) using a presence capture device, which may be placed on stage, with the performers moving around it or from the point of view of an audience member. In each case a consumer of the VR content may be able to look around using the VR display of the VR apparatus to experience the performance at the capture location as if they were present.

In addition to the audio received from the microphone(s) of the presence capture device or as an alternative, further microphones each associated with a distinct audio source may be provided. Thus, microphones may be provided at one or more locations within the scene captured by the presence capture device to each capture audio from a distinct audio source. For example, using the musical performance example, a musical performer or a presenter may have a personal microphone. Knowledge of the location of each distinct audio source may be obtained by using transmitters/receivers or identification tags to track the position of the audio sources, such as relative to the presence capture device, in the scene captured by the presence capture device.

Audio sources may be grouped based on the type of audio that is received from the audio sources. For example, audio type processing of the audio may categorise the audio as speaking audio or singing audio. It will be appreciated other categories are possible, such as speaking, singing, music, musical instrument type, shouting, screaming, chanting, whispering, a cappella, monophonic music and polyphonic music.

Control of audio mixing for VR content, particularly of audio sources that are grouped based on the type of audio, is provided by the example apparatus 100 of FIG. 1. The apparatus 100 is configured to provide for audio mixing a plurality of distinct audio sources 101, 102. The audio sources comprise a presenter 101 and a singer or musician 102. A presence capture device 103 may be configured to capture VR content of a scene of which the presenter 101 and a singer 102 are a part. An audio source location tracking element 104 may track the location of the distinct audio sources in the scene.

The apparatus 100 is configured to provide for control of audio mixing of VR content, such as during capture of the VR content or of pre-recorded VR content.

The apparatus 100 may be in communication with a VR apparatus 105 for presenting the VR content captured by the presence capture device 103 to a director 106, who may use a VR head set (not shown) or other VR display to view the VR content and provide for control of the audio mixing, illustrated by dashed line 107. In other examples, the apparatus 100 may be in communication with an AR apparatus, who may use an AR headset or other AR display to provide for control of the audio mixing.

The provision of audio mixing control of the distinct audio sources 101, 102 may be based on the current VR view of the director 106 while viewing the VR content using the VR display. Accordingly, the VR apparatus 105 may provide signalling to the apparatus 100 to indicate where in the VR scene the director 106 is looking such that it can be determined which audio sources 101 102 are visible in the current VR view. Thus, the apparatus 100 may determine the audio sources within the current field of view of the VR scene presented in VR to the director 106 based on VR view data from the VR apparatus 105 and audio location tracking information from or captured by the audio source location tracking element 104. In some examples the provision of audio mixing control of the distinct audio sources 101, 102 may be based on the current AR view of the director 106. Accordingly, the AR apparatus may provide signalling to the apparatus 100 to indicate where the director 106 is looking such that it can be determined which audio sources 101 102 are visible in the current AR view. Thus, the apparatus 100 may determine the audio sources within the current field of view based on audio location tracking information from or captured by the audio source location tracking element 104.

Accordingly, the apparatus 100 is configured to, based on a plurality of distinct audio sources 101, 102 visible in a virtual or augmented reality view, provide for control of audio mixing of groups of the distinct audio sources in the virtual or augmented reality view, the groups determined by automatic grouping of the distinct audio sources based on analysis of the type of audio from each of the distinct audio sources.

In this embodiment the apparatus 100 mentioned above may have only one processor 110 and one memory 111 but it will be appreciated that other embodiments may utilise more than one processor and/or more than one memory (e.g. same or different processor/memory types). Further, the apparatus 100 may be an Application Specific Integrated Circuit (ASIC). The apparatus 100 may be integrated with the presence capture device 103 and/or VR/AR apparatus 105.

The processor 110 may be a general purpose processor dedicated to executing/processing information received from other components, such as VR/AR apparatus 105 and audio source location tracking element 104 in accordance with instructions stored in the form of computer program code on the memory. The output signalling generated by such operations of the processor is provided onwards to further components, such as VR/AR apparatus 105 or to a VR content store (not shown) for recording the VR content with the audio mixed by the apparatus.

The memory 111 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor 110 and the memory 111 are all electrically connected to one another internally to allow for electrical communication between the respective components. In this example the components are all located proximate to one another so as to be formed together as an ASIC, in other words, so as to be integrated together as a single chip/circuit that can be installed into an electronic device. In other examples one or more or all of the components may be located separately from one another.

In the description that follows, we provide examples in terms of providing for control of the audio mixing based on distinct audio sources in a current virtual reality view, for brevity. However, it will be appreciated that the control of audio mixing may be based on distinct audio sources in a current augmented reality view and the views and graphics presented below may be presented using augmented reality, as appropriate.

Figure 2:
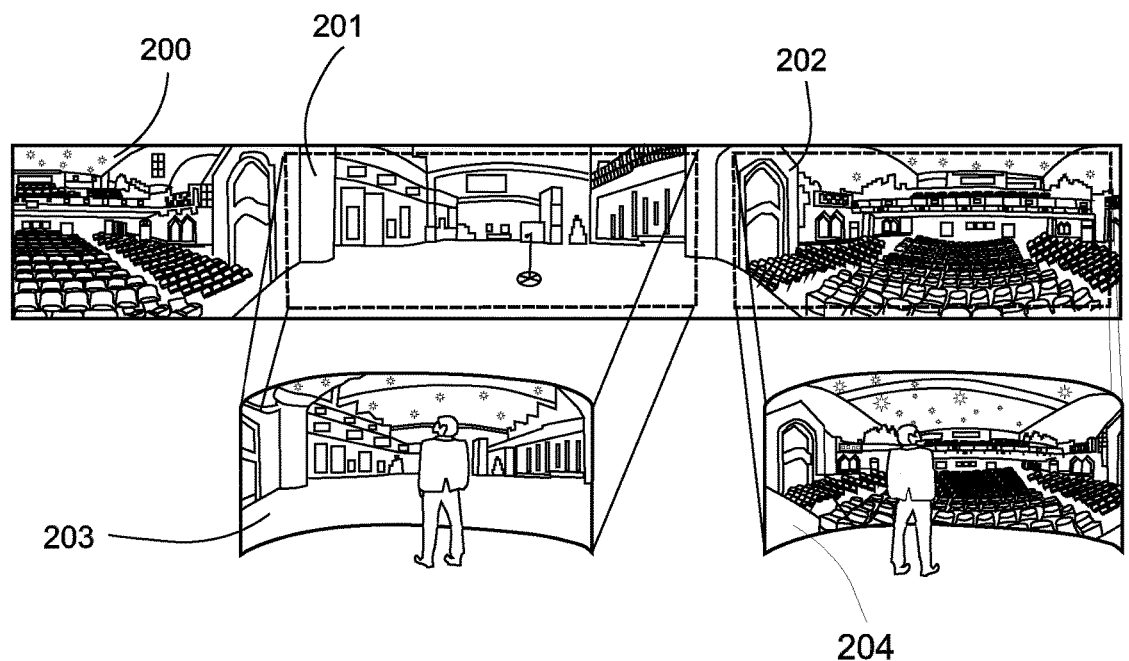
FIG. 2 illustrates an example virtual reality scene and a virtual reality view in said virtual reality scene.

FIG. 2 shows a panoramic representation of the VR scene 200. The presence capture device 103 has captured a 360° view of a real world scene comprising a theatre. Boxes 201 and 202 show a first and second field of view visible to a director when using the VR apparatus 105 relative to the VR scene 200. It will be appreciated that only a spatial portion of the VR scene is visible in a VR view based on the field of view. Curved representations 203 and 204 schematically show, respectively, the VR view displayed to the director 206 based on the corresponding first and second fields of view 201, 202 in the VR scene 200.

Figure 3:
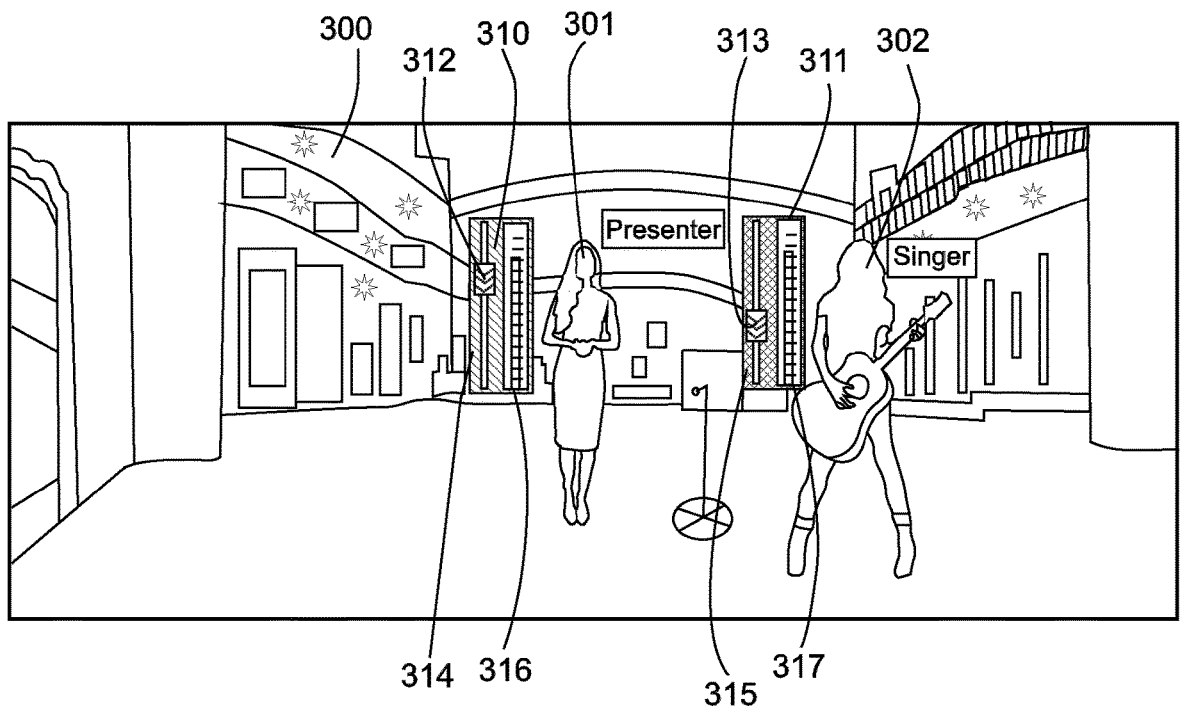
FIG. 3 illustrates an example virtual reality view showing display of a control graphic.

FIG. 3 shows a VR view 300 comprising the current virtual field of view of the director 206 using the VR apparatus 105. In the VR view a theatre stage is visible along with the presenter 301 and the singer 302. The VR view comprises VR content of the real world (i.e. the stage and people) as well as VR graphics, which may be generated by the VR apparatus 105 based on signalling received from apparatus 100. The VR graphics comprise a control graphics comprising a first audio level control interface 310 associated with the presenter 301 and a second audio level control interface 311 associated with the singer 302. The VR graphics are each associated with a distinct audio source and thus, in particular, the VR graphics are associated with the location of the microphone of the presenter 101 and the microphone of the singer 301. Accordingly, the apparatus 100 may receive audio source location signalling from the audio location tracking element 104 and provide for display, using the VR apparatus 105, of the VR control graphics positioned at the appropriate locations in the VR view. In this example, the VR graphics 310, 311 are displayed offset by a predetermined amount from the actual location of the microphone so as not to obscure the director's view of the person/object (i.e. audio source) associated with the microphone in the VR view.

The audio sources 301 and 302 have been grouped into different audio types by audio type determination apparatus associated or part of the apparatus 100. Thus, each audio type identified defines an audio type group which includes one or more of the audio sources with a common audio type. In this example, the audio type determination apparatus has determined, based on audio analysis of each audio source, that the presenter 301 comprises an audio source of type "speaking" and the singer comprises an audio source of type "singing". The audio type assigned to each source is displayed in the VR view 300 by a type-designating "group graphic" which may comprise a characteristic of a particular graphic. In this example, the audio type assigned to each audio source may be shown by different types of audio level control interface 310, 311. The audio type assigned to each audio source is, in this example, represented by colour coding of the audio level control interface 310, 311. It will be appreciated that in other examples, textual labelling or patterning could be used or the groupings may be displayed in turn and/or on selection of a particular group by the director 106. Further the type-designating graphic may not be associated with the audio level control interface 310, 311 of the particular audio source and may comprise a VR graphic displayed separate from the respective audio level control interface 310, 311.

The first audio level control interface 310 and the second audio level control interface 311 include virtual sliders 312 and 313 respectively representative of a slider of a mixing desk for control of the audio level of the associated, grouped, audio source 301, 302. The position of the slider along a virtual track 314, 315 represents the current audio mixing setting or audio level set point of the associated, grouped, audio source 301, 302. The interfaces 310, 311 each include an audio level indicator 316, 317 which shows an actively updated representation (e.g. a level bar) of the instantaneous audio output from that audio source. In this example, the audio level indicators 316, 317 shows the current volume of the audio of the audio source and therefore a tall bar represents louder audio from that particular source, while a short bar or no bar represents quieter or no audio from that particular audio source at a particular instant in time.

In FIG. 3, the speaking type audio source(s), namely the presenter audio source 301, is set to a higher relative level that the singing type audio source(s), namely the singer audio source 302, by virtue of the relative positions of the sliders 312, 313. The audio level indicators 316, 317 show that both audio sources are contributing to the audio of the VR content and are thus heard by the director 106. It will be appreciated that other graphics to show control of the audio mixing is possible, such as virtual dials or virtual digital displays. Further, it will be appreciated that other graphics to show the audio level are possible, such as virtual digital displays and in some examples, the audio level indicators may not be shown at all or only on selection of an audio type group.

The apparatus 100 may be configured to provide for control of audio mixing by signalling received from an input device of the VR apparatus 105 or of the apparatus 100 operated by the director 106. In this example, user input (from the director 106) is provided by a touchscreen input device comprising a smart phone (or other handheld controller) that is associated with the VR apparatus 105. The smart phone may be associated with the VR apparatus by virtue of the software it is executing and appropriate communication between the VR apparatus and the smartphone. In other examples, free space user gestures may be used to control the sliders 312, 313 and the VR apparatus may be configured to capture the director's 106 hand movements and relate them to the first audio level control interface 310 and the second audio level control interface 311 in order to provide signalling to the apparatus 100. For example, the VR view 300 may include a representation of the director's hand (not shown) as feedback of his/her hand movements.

Signalling representative of the user input may be used by the apparatus 100 to control the relative audio levels between the audio type "speaking" and "singing" groups (i.e. the presenter 301 and the singer 302, in this example) to affect audio mixing.

Figure 4:
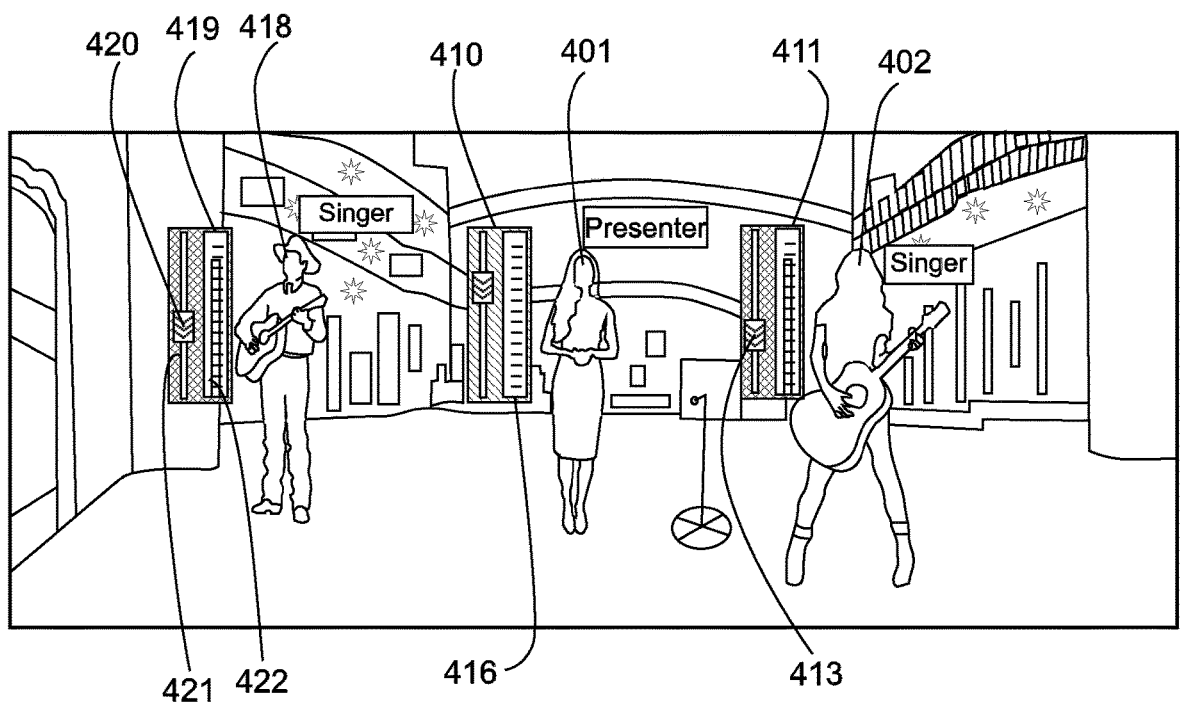
FIG. 4 illustrates an example virtual reality view showing display of a group graphic.

FIG. 4 shows a VR view 400 similar to FIG. 3 except that in this Figure an additional audio source 418 is present. The additional audio source comprises a second singer 418 (such as an additional band member of singer 402). Both singers are within the VR view of the director 106 and, accordingly, the grouping of the audio sources has identified the second singer 418 as being an audio source of "singing" type along with the singer 402. Accordingly, the singer 402 and the second singer 418 have been grouped together in the VR view 400 in the singing audio type group. A third audio level control interface 419 is provided for display associated with the second singer 418. The third audio level control interface 419 includes a slider 420, a track 421 and an audio level indicator 422, similar to the other audio level control interfaces 410, 411. As the additional audio source 418 is grouped with the singer 402, the audio type assigned to the audio source is displayed in the VR view by way of the audio level control interface 419 having its type-designating group graphic/characteristic in common with audio level control interface 411, namely its colour or pattern in this example. Thus, in some examples, membership of the "singing" audio type group is shown by blue audio level control interfaces while membership of the "speaking" audio type group is shown by orange audio level control interfaces. In the figures, patterning is used to distinguish between them rather than colour. It will be appreciated that other colours may be used.

Alteration or control of the audio mixing may be provided by user input of the director, as described above. The control may be advantageously provided based on the grouping of the audio sources. Thus, the apparatus 100 may be configured to receive a first user input to control the audio level of the presenter 401 (the speaking audio type group) and a second user input to control the audio level of the singer 402 and additional singer 419 together (the singing audio type group).

Accordingly, the audio level of the collective group of the audio source 402 and the additional audio source 418 may be changed in response to manipulation of either of sliders 420 and 413 (or provision of user input to affect such a manipulation where the sliders present feedback of the current level or change in level). Thus, the audio level of the audio sources 418, 402 that are of a common type and are visible in the current VR view 400 may be controlled together. In some examples, the audio level of the audio sources 418, 402 may be controlled separately.

In FIG. 4, the audio level indicator 416 of the presenter 401 is shown as zero indicating no audio is currently being provided (i.e. she is not speaking). However, the audio level control interface 410, with its group type designating colour, is still shown associated with the presenter 401. Thus, the last assigned grouping may be used for the continued display of an audio level control interface 410 for a particular audio source. The display of an audio level control interface 410 may be provided for a predetermined time after audio was last received (above a minimum threshold level, for example) from the associated audio source. After such a predetermined time, the audio level control interface 410 may be removed from the VR view 400. When audio is received from said audio source, the audio level control interface may be re-displayed. In other examples, the audio level control interface 410 may remain indefinitely.

The audio level control interface 410 of the presenter 401, despite not currently contributing to the audio of the VR content, may be adjusted as described above such that when audio is received from the presenter 401 it is presented at the desired set-point level.

Figure 5:
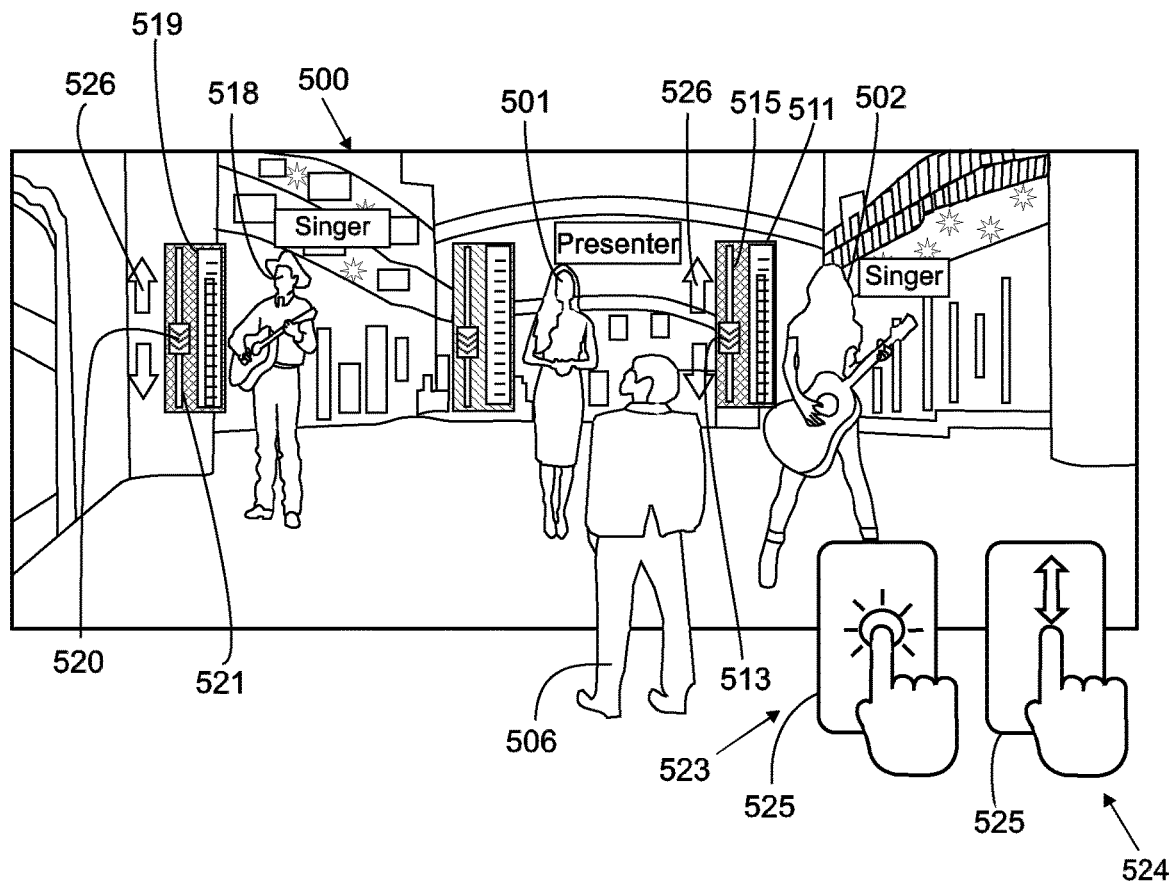
FIG. 5 illustrates an example virtual reality view showing collective control of a group of audio sources.

FIG. 5 shows control of audio mixing of the "singing" audio type group with example user inputs 523 and 524 of the director 506. A touchscreen input device 525, such as a smart phone, is shown in this example. Thus, the apparatus 100 is configured to, based on a first user input type 523, which in this example comprises a tap on the input device 525, collectively select the audio sources that belong to one of the audio type groups. The first user input type, in this example, comprises tapping, although in other examples it may comprise selecting a particular audio type group from a list. In response to the first user input type 523, in this example, the apparatus is configured to cycle through the audio type groups. The VR view 500 of FIG. 5 shows that following the first user input tap 523, the "singing" audio type group has been selected. In particular, on selection, a selection graphic 526 is shown associated with each of the members of the selected group to identify their group selection to the user. Thus, the audio level control interfaces 511 and 519 of the two singers 502, 518 are displayed with the selection graphic 526 because they belong to the singing audio type group. The second user input type 524 effects the change in audio level for audio mixing of the selected group. In this example, the second user input type comprises a slide gesture along the touchscreen input device. The slide gesture conveniently mimics use of a physical slider. In other examples, the second user input type may comprise entering a value to set the audio level or a selecting a particular audio level from a list. In response to the second user input type 524, in this example, the apparatus is configured to collectively adjust the audio level and provide feedback by adjusting the position of the sliders 520, 513 in the tracks.

On receipt of a further first user input type, the speaking group may be selected for adjustment using the second user input type.

In other examples, the first user input type 523 and second user input type 524 may be part of the same gesture. For example, a slide gesture on one part of the touchscreen input device may collectively adjust the audio level for one of the audio type groups and a slide gesture on a different part of the touchscreen input device may collectively adjust the audio level for another of the audio type groups. Effectively, in this example, the positioning of the slide gesture comprises the first user input type and the slide motion comprises the second user input type. It will be appreciated that selection of an audio type group and the collective adjustment of the audio level of the members of the audio type group may be provided based on any predetermined user input.

Figure 6:
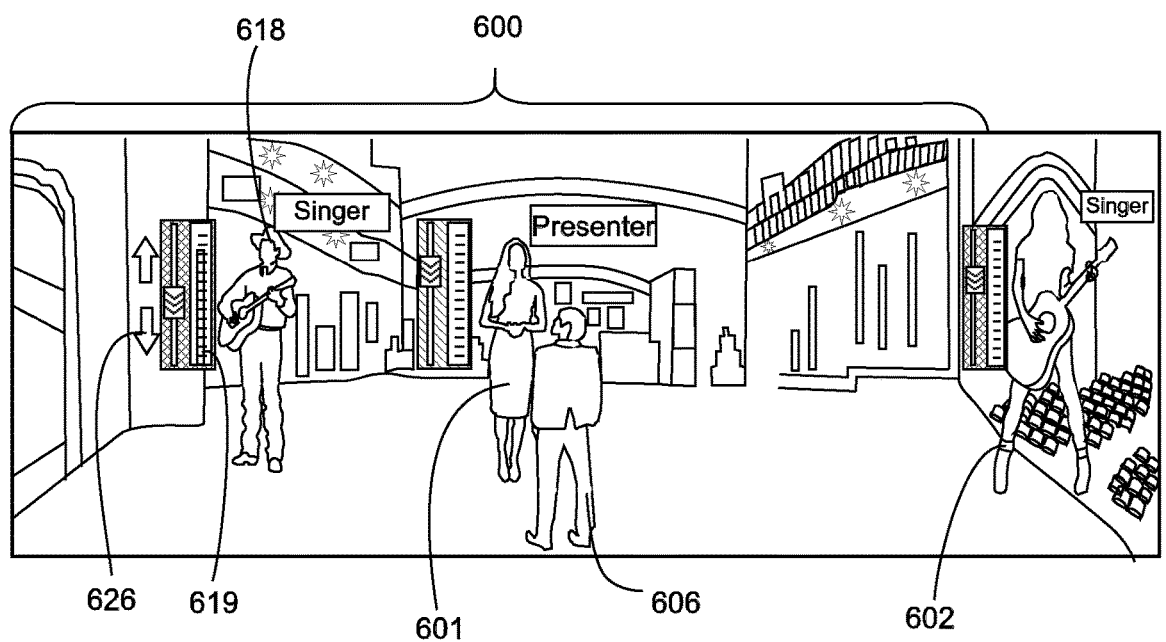
FIG. 6 illustrates an example virtual reality scene, wider than the virtual reality view and showing control of a group of audio sources.

FIG. 6 shows a view of the VR scene wider than the VR view 600 visible to the director 606. Thus, in the portion of the VR scene visible to the director (i.e. the current VR view 600) only the second singer 618 and the presenter 601 are visible while the singer 602 is out of view and therefore not visible to the director 606. As in the example of FIG. 5, the director has made a selection of the singing audio type group. However, given that control of the audio levels of the audio type groups is provided based on the VR view 600, only the visible second singer 618 is selected. Thus, a selection graphic 626 is provided associated with the audio control interface 619 of the second singer 618 only. Adjustment of the audio levels is only applied to the audio of the second singer 618 who is visible in the VR view and not to the singer 602 who is not visible in the VR view.

It will be appreciated that only the control of the audio mixing of the groups may be based on the audio sources visible in the VR view or both the control of the audio mixing of the groups and the grouping of the audio sources may be based on the VR view. For example, in FIG. 6, the apparatus 100 may perform the grouping of all audio sources 601, 602, 618 in the VR scene irrespective of whether or not they are visible in the VR view of the director 606. Subsequent group control of the audio levels is then based on the audio sources visible in the VR view. Thus, while the singer 602 and the second singer 618 will both be grouped as audio type singing, the apparatus provides for adjustment of the audio levels based only on the members of the group that are visible in the current VR view.

In another example, the apparatus 100 may be configured to group the audio sources based on their audio type and whether or not they are visible in the VR view 600. Accordingly, in the example of FIG. 6, the second singer 618 would be assigned to the singing group and the presenter 601 would be assigned to the speaking group, while the singer 602 would not be grouped (nor subsequently controlled) because she is not visible in the VR view 600.

Accordingly, the members of a predetermined group that are available for control may be updated in real-time based on the current VR view 600. Alternatively, the grouping of the audio sources may be updated in real-time based on the audio sources visible in the current VR view 600. Performing the grouping only on the audio sources visible in the VR view 600 may reduce the processing burden for performing said audio type analysis. However, in other circumstances, it may be advantageous to group all of the audio sources irrespective of their visibility in the VR view such that group control may be provided more readily when the director moves the VR view 600 to include previously non-visible audio sources.

Subsequently, if the singer 602 enters the VR view or the VR view 600 changes to include the singer 602, the audio levels of the singer 602 will be automatically provided for control along with the second singer 618 given they are grouped together. Any relative offset between the audio level of the second singer 618 and the singer 602 set previously may be retained when the audio levels are controlled collectively as part of the singing audio type group. In other examples, the apparatus may provide for matching of audio levels between mis-matched members of the same group when in the VR view 600. Thus, one or both of the audio sources may be adjusted to achieve said matching.

Figure 7:
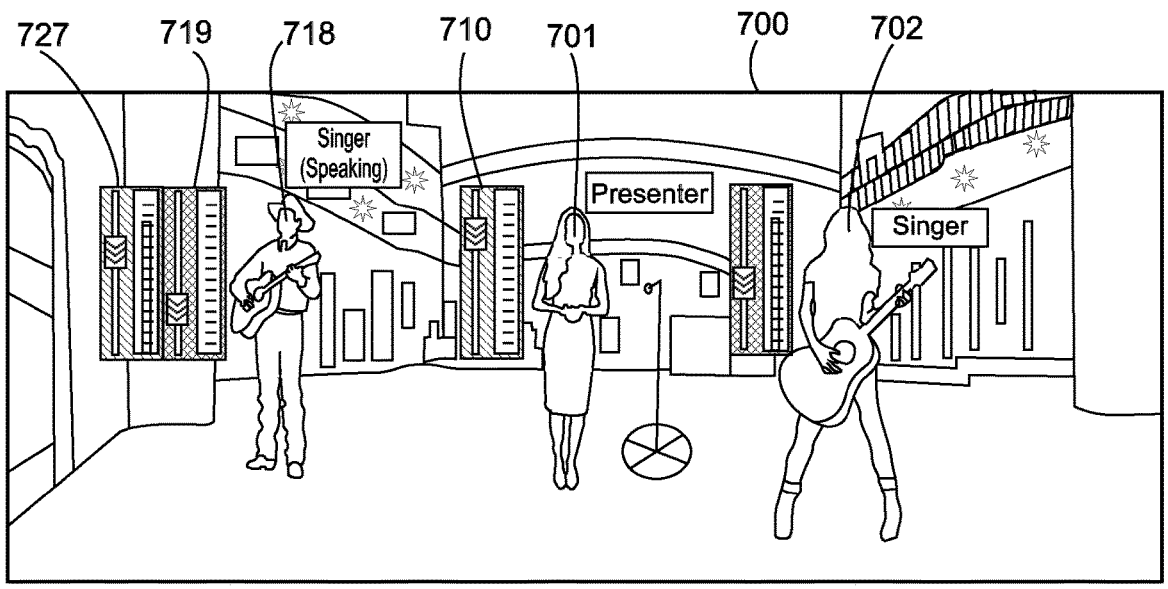
FIG. 7 illustrates an example virtual reality view showing display of multiple control graphics for a particular audio source.

FIG. 7 shows a further example in which the grouping of audio sources 701, 702, 718 is based on analysis of the current audio received from the respective audio source and historic audio received from the respective audio source over a predetermined period prior to the current time. The predetermined period may be 5 seconds, 10 seconds, 30 seconds, 1 minute, 2 minutes, 5 minutes, 30 minutes or more. The predetermined period may be user set.

The group to which an audio source belongs may be actively updated based on the current audio received therefrom. For example, if the second singer 718 generated audio of a different type, e.g. went from singing to speaking, then they would be automatically regrouped in the different, speaking group. If grouping is additionally based on historic audio, then each audio source may be a member of one or more groups. FIG. 7, in VR view 700, shows that the second singer 718 has started speaking rather than singing. In response to the change in audio type grouping of the audio source 718, an additional audio control interface 727 is provided along with the audio control interface 719. The additional audio control interface 727 may have a type-designating graphic or characteristic, which in this example is provided by the colour. Accordingly, the colour of the additional audio control interface 727 is the same as the audio control interface 710 of the presenter, as they are both associated with the same audio type group (i.e. speaking).

Each audio control interface provides for control of or feedback of the control of the audio level of audio of its associated type (i.e. the group). Thus, the additional audio control interface 727 may be associated with speaking audio type and the audio control interface 719 may be associated with singing audio type. Thus, the audio levels set for a grouped audio source by the apparatus in response to user input may apply only when the audio source generates audio of the same type in the future. For example, adjustment of the levels for an audio source grouped in the singing audio type group does not affect the audio level of the same audio source if they subsequently started generating audio of a different type, e.g. speaking. The audio levels for speaking may need to be adjusted separately.

Figure 8:
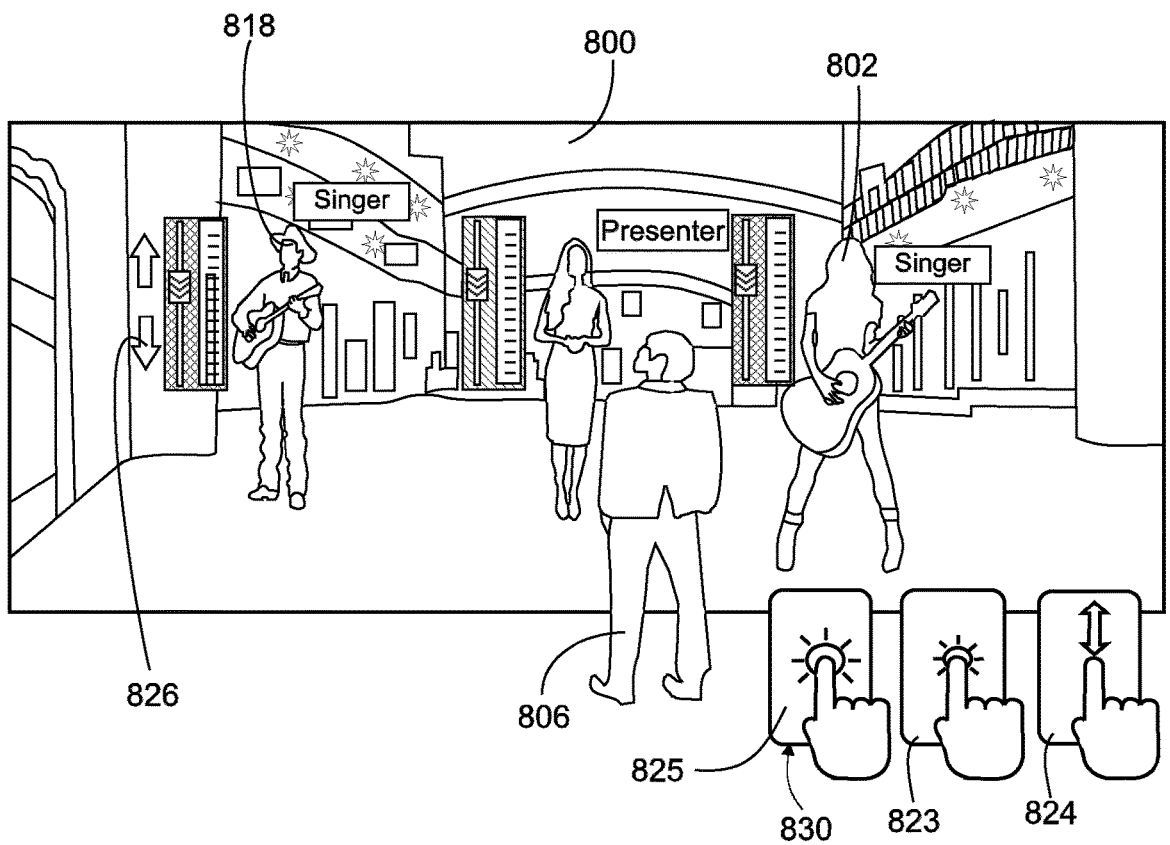
FIG. 8 illustrates an example virtual reality view showing control of members of a group of audio sources.

FIG. 8 shows a VR view 800 similar to FIG. 5, however, in this example the apparatus 100 is configured to provide for control of a subset or single member of an audio type group of audio sources that are visible in the VR view 800. In this example, the singer 802 and the second singer 818 are both grouped together in the singing audio type group. Thus, as shown in FIG. 5, a user may provide a first user input type to select a particular group of audio sources and a second user input type to collectively change the audio level. In addition, the apparatus may provide for control of individual members of a group of visible audio sources in response to a third user input type 830. In this example, the third user input type 830 comprises a tap and hold gesture on the touchscreen input device 825. The tap and hold gesture may need to be provided for a predetermined length of time. This third user input type 830 may enter a group member edit mode. In this mode, receipt of the first user input type 823 (or different input type/gesture) may provide for selection of one of the group members, which in this example is shown to be the second singer 818 by the provision for display of the selection graphic 826. The first user input type 823 may cycle through the members of the selected group that are visible in the VR view 800. In group member edit mode, the selection of the selection graphic 826 is provided for only one of the audio sources at a time. Further, in the group edit mode, receipt of the second user input type 824 (or different input type/gesture) may provide for control of the individual group members despite another member of the group (the singer 802) being visible in the VR view 800. Thus, the apparatus 100 may provide for collective control of audio levels of groups of audio sources in a first edit mode and individual control of audio levels of members of the groups of audio sources in a second, group member edit mode.

In each of the above examples, the apparatus may be configured to provide for control of different audio level types such as volume, gain, bass, treble, mid-range frequency among others. Accordingly, in response to a particular user input the apparatus may provide for selection of a specific audio level type amongst a plurality of audio level types.

Figure 9:
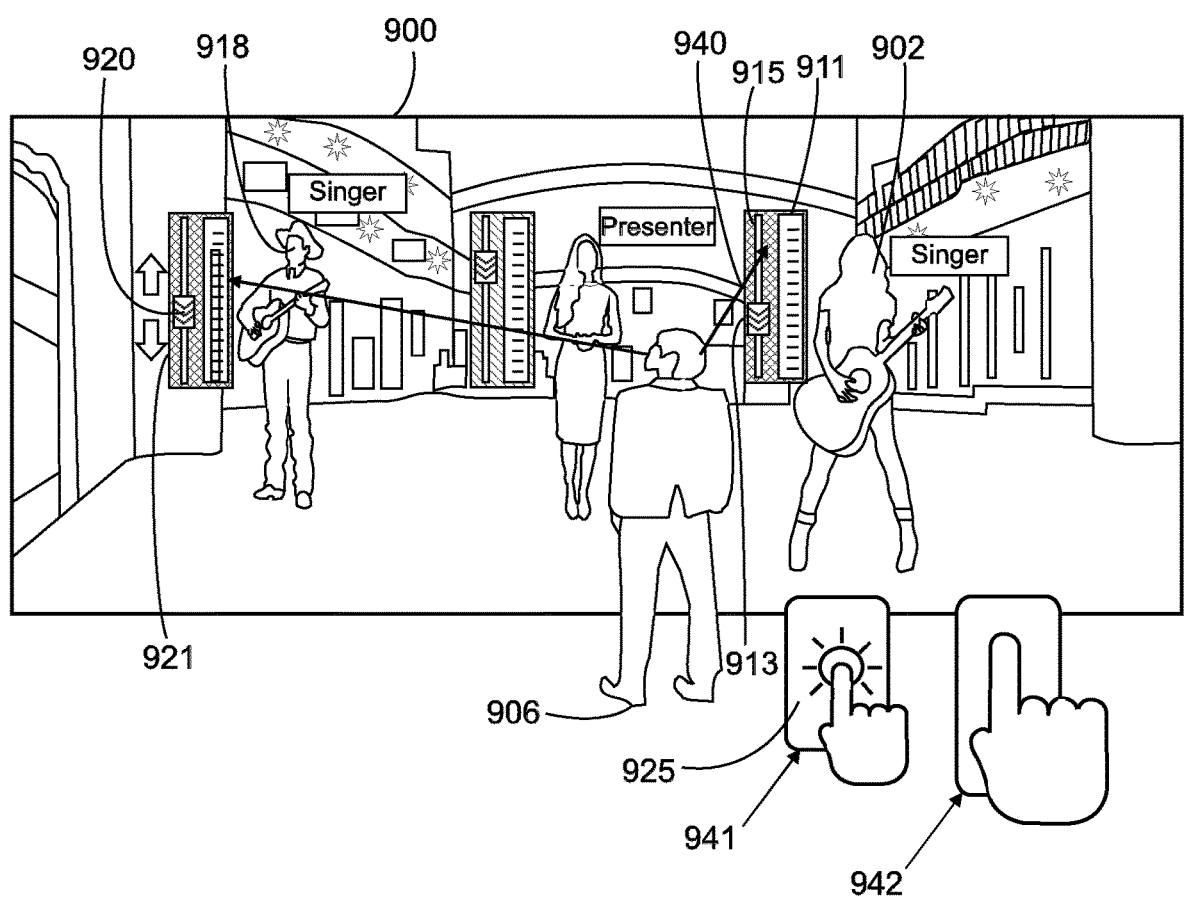
FIG. 9 illustrates an example virtual reality view showing copying of an audio level set point form one audio source and its application to another audio source.

FIG. 9 shows a further example in which a current set point of an audio level for audio mixing is copied from one audio source to another audio source. Thus, more generally, the apparatus 100 is configured to, based on one or more audio sources in the VR view, adjust the audio level of said one or more audio sources to adopt a predetermined audio level set point. The apparatus may use a target area in the VR view to identify a particular one or subset of the audio sources visible in the VR view 900. The target area may comprise the centre of the VR view or an overlaid VR "target area" graphic in the VR view 900. The predetermined audio level set point may the set point of a different audio source or group of audio sources in the VR scene. In other examples, the predetermined audio level set point may be user entered and the apparatus provides for easy application of the user entered set point based on an audio source the director 906 is looking at in the VR scene or within the VR view.

In particular, FIG. 9, shows that the director 906, in the VR view 900, has first focussed his gaze 940 (such as by centring the singer 902 in the VR view 900) on the singer 902. The director then provides a user input 941 to "copy" the audio level set point of the singer 902. The "copy" user input comprises a tap and hold in this example. While continuing to provide the user input 941, the director moves to focus his gaze 940 (such as by centring the second singer 918 in the VR view 900) on the second singer 918. On release 942 of the touchscreen input device 925, the apparatus 100 is configured to use the copied audio level set point to adjust the audio level of the second singer 918. Accordingly, the slider 920 may move to a corresponding position in the track 921 as the slider 913 in the track 915 of the audio control interface 911 of the singer 902.

FIG. 10 shows an example schematic diagram showing the functional arrangement of an audio mixing system 1000 that includes the apparatus 100. The system 1000 includes the apparatus 100, the microphones of each audio source 1002, 1003, 1018, the presence capture device 1003, the audio source location tracking device 104 and the VR apparatus 1005. Accordingly, each audio source is configured to provide its audio to the apparatus 100 shown by lines 1002a, 1003a and 1018a. Each audio source is also configured to provide its audio to an audio type determination apparatus 1002b, 1003b, 1018b (which although shown separately may be part of the apparatus 100). Accordingly, the audio type determined by each audio type determination apparatus 1002b, 1003b, 1018b is also provided to the apparatus 100. Further a location of each of the audio sources is provided to the apparatus, as shown by dashed lines 1001c, 1002c and 1018c.

In this example, the apparatus 100 receives audio from the personal microphones of the audio sources as well as audio 1003a captured by the presence capture device 1003 for audio mixing.

The presence capture device 1003 provides its VR video 1003v to the VR apparatus 1005 for VR viewing by the director. The apparatus 100 is configured to provide the audio 1060 for presentation to the director alongside the VR video. Thus, when using the VR apparatus 1005 the director will be able to hear the audio (from all of the audio sources or perhaps just the ones in the VR view) as it is currently mixed. The audio 1060 is provide along with audio mixing information which may be used by the VR apparatus 1005 to generate the VR graphics described above. Alternatively, the apparatus 100 may provide the VR graphics for display along with location information so that they can be rendered in the appropriate location in the VR view by the VR apparatus 1005. Further, user input from the VR apparatus 1005 or other input device is shown provided to the apparatus 100 by line 1061.

Throughout the disclosure, the term "director" is used to refer to the user of the VR apparatus 105, however, it will be appreciated that this designation is not any more limiting than use of the term "user".

As mentioned above, the principles described above are equally applicable in augmented reality. Thus, in other examples, the VR views 300, 400, 500, 600, 700, 800, 900 may comprise the augmented reality view of the director/user. Accordingly, the audio level control interfaces and any other displayed graphics may be overlaid onto the AR view in appropriate positions for association with the corresponding audio source.

FIG. 11 shows a flow diagram illustrating the steps of based on a plurality of distinct audio sources visible in a virtual/augmented reality view, providing 1170 for control of audio mixing of groups of the distinct audio sources in the virtual/augmented reality view, the groups determined by automatic grouping of the distinct audio sources based on analysis of the type of audio from each of the distinct audio sources.

FIG. 12 illustrates schematically a computer/processor readable medium 1280 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping the device.

The apparatus shown in the above examples may be part of a VR apparatus, AR apparatus, part of a presence capture device, a portable electronic device, a laptop computer, a mobile phone, a Smartphone, a tablet computer, a personal digital assistant, a digital camera, a smartwatch, a non-portable electronic device, a desktop computer, a monitor, wearable apparatus, a smart TV, a server, or a module/circuitry for one or more of the same.

Any mentioned apparatus/device/server and/or other features of particular mentioned apparatus/device/server may be provided by apparatus arranged such that they become configured to carry out the desired operations only when enabled, e.g. switched on, or the like.

In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one memory including computer program code,
the at least one memory and the computer program code configured to, with the at least one processor, cause the apparatus to perform at least the following:
determine one or more audio types for a plurality of distinct audio sources visible in a current virtual or augmented reality view by comparing current audio received from said plurality of distinct audio sources to historic audio received from said plurality of distinct audio sources;
automatically group said plurality of distinct audio sources into one or more groups based upon said determination of said one or more audio types for said plurality of distinct audio sources; and
provide for control of audio mixing of said one or more groups of said plurality of distinct audio sources in the virtual or augmented reality view.

2. The apparatus of claim 1, wherein the types of audio used for grouping comprises one or more of: speaking, singing, music, musical instrument type, shouting, screaming, chanting, a cappella, monophonic music and polyphonic music.

3. The apparatus of claim 1, wherein the control of the audio mixing of groups of the distinct audio sources in the virtual or augmented reality view is further based on the location of the audio sources in the virtual or augmented reality view, wherein a control graphic is provided for display in the virtual or augmented reality view at said location to associate it with the audio source it represents, the control graphic providing feedback on the control of the audio mixing.

4. The apparatus of claim 3, wherein the control graphic shows a current set point of the audio level of its associated audio source.

5. The apparatus of claim 3, wherein the control graphic shows an audio level indicator indicative of an instantaneous property of the audio from the associated source.

6. The apparatus of claim 1, wherein the automatic grouping of the distinct audio sources is based on one of:
a) audio sources within and outside of the current virtual or augmented reality view;
b) only audio sources within the current virtual or augmented reality view.

7. The apparatus of claim 1, wherein on receipt of a first user input, the apparatus is configured to provide for selection of one of the groups of the audio sources and on receipt of a second user input provide for collective adjustment of the audio level set point of the audio level of the audio sources of the selected group that are visible in the current virtual or augmented reality view.

8. The apparatus of claim 1, wherein based on the location of the audio sources in the virtual or augmented reality view and the automatic grouping, a group graphic for each distinct audio source is provided for display in the virtual or augmented reality view and positioned therein based on the location to associate it with the audio source it represents, the group graphic providing feedback on which group a particular audio source is a member.

9. The apparatus of claim 8, wherein the group graphic comprises, for each group, one or more of a different colour, a different pattern, a different textual designation, a different shape, or a different icon.

10. The apparatus of claim 1, wherein the automatic grouping of the distinct audio sources is dynamic and the grouping is actively determined based on the current audio received from the audio sources.

11. The apparatus of claim 1, wherein the historic audio comprises audio received a predetermined amount of time prior to a current time, and wherein one or more of the plurality of distinct audio sources are each grouped in one or more groups based on the audio analysis at the current audio and the historic audio.

12. The apparatus of claim 1, wherein the apparatus is configured to, based on one or more audio sources in the virtual or augmented reality view, adjust the audio level of said one or more audio sources to adopt a predetermined audio level set point on receipt of user input.

13. The apparatus of claim 12, wherein the predetermined audio level set point comprises an audio level set point of one other of the audio sources such that an audio level set point can be copied from one audio source to another.

14. A computer-implemented method comprising
determining, using at least a processor, one or more audio types for a plurality of distinct audio sources visible in a current virtual or augmented reality view by comparing current audio received from said plurality of distinct audio sources to historic audio received from said plurality of distinct audio sources;
automatically grouping said plurality of distinct audio sources into one or more groups based upon said determination of said one or more audio types for said plurality of distinct audio sources; and
providing for control of audio mixing of said one or more groups of said plurality of distinct audio sources in the virtual or augmented reality view.

15. The method of claim 14, wherein the types of audio used for grouping comprises one or more of: speaking, singing, music, musical instrument type, shouting, screaming, chanting, a cappella, monophonic music and polyphonic music.

16. The method of claim 14, wherein the control of the audio mixing of groups of the distinct audio sources in the virtual or augmented reality view is further based on the location of the audio sources in the virtual or augmented reality view, wherein a control graphic is provided for display in the virtual or augmented reality view at said location to associate it with the audio source it represents, the control graphic providing feedback on the control of the audio mixing.

17. The method of claim 16, wherein the control graphic shows a current set point of the audio level of its associated audio source.

18. The method of claim 16, wherein the control graphic shows an audio level indicator indicative of an instantaneous property of the audio from the associated source.

19. The method of claim 14, wherein the automatic grouping of the distinct audio sources is based on one of;
a) audio sources within and outside of the current virtual or augmented reality view;
b) only audio sources within the current virtual or augmented reality view.

20. At least one non-transitory computer readable medium comprising instructions that, when executed, cause a computing device to perform at least the following:
determine one or more audio types for a plurality of distinct audio sources visible in a current virtual or augmented reality view by comparing current audio received from said plurality of distinct audio sources to historic audio received from said plurality of distinct audio sources;
automatically group said plurality of distinct audio sources into one or more groups based upon said determination of said one or more audio types for said plurality of distinct audio sources; and
provide for control of audio mixing of said one or more groups of said plurality of distinct audio sources in the virtual or augmented reality view.

* * * * *